United States Patent [19]

Ueltz et al.

[11] 4,194,887
[45] Mar. 25, 1980

[54] FUSED ALUMINA-ZIRCONIA ABRASIVE MATERIAL FORMED BY AN IMMERSION PROCESS

[75] Inventors: Herbert F. G. Ueltz, Youngstown; Melvin A. Dashineau; James J. Pino, both of Niagara Falls, all of N.Y.

[73] Assignee: U.S. Industries, Inc., New York, N.Y.

[21] Appl. No.: 859,115

[22] Filed: Dec. 9, 1977

Related U.S. Application Data

[62] Division of Ser. No. 636,403, Dec. 1, 1975, Pat. No. 4,073,096.

[51] Int. Cl.$^2$ ............................................. C09C 1/68
[52] U.S. Cl. ...................................... 51/309; 264/57; 264/215
[58] Field of Search ................... 51/309, 293; 264/57, 264/60, 215

[56] References Cited

U.S. PATENT DOCUMENTS

| | | | |
|---|---|---|---|
| 3,891,408 | 6/1975 | Rowse et al. | 51/309 |
| 3,977,132 | 8/1976 | Sekigawa | 51/309 |
| 4,035,162 | 7/1977 | Brothers et al. | 51/309 |
| 4,061,699 | 12/1977 | Cichy | 51/309 |
| 4,070,796 | 1/1978 | Scott | 51/293 |
| 4,073,096 | 2/1978 | Ueltz et al. | 51/309 |

*Primary Examiner*—Donald J. Arnold
*Attorney, Agent, or Firm*—Darby & Darby

[57] ABSTRACT

Process for the manufacture of abrasive material in which (1) an abrasive mix is brought to fusion as in an electric arc furnace, (2) a relatively cold substrate is dipped into the molten material whereby a layer of solid abrasive material is quickly frozen (or plated) on the substrate, (3) the plated substrate is withdrawn from the molten material and (4) the solidified abrasive material is broken away from the substrate and collected for further processing to produce abrasive grain.

8 Claims, 2 Drawing Figures

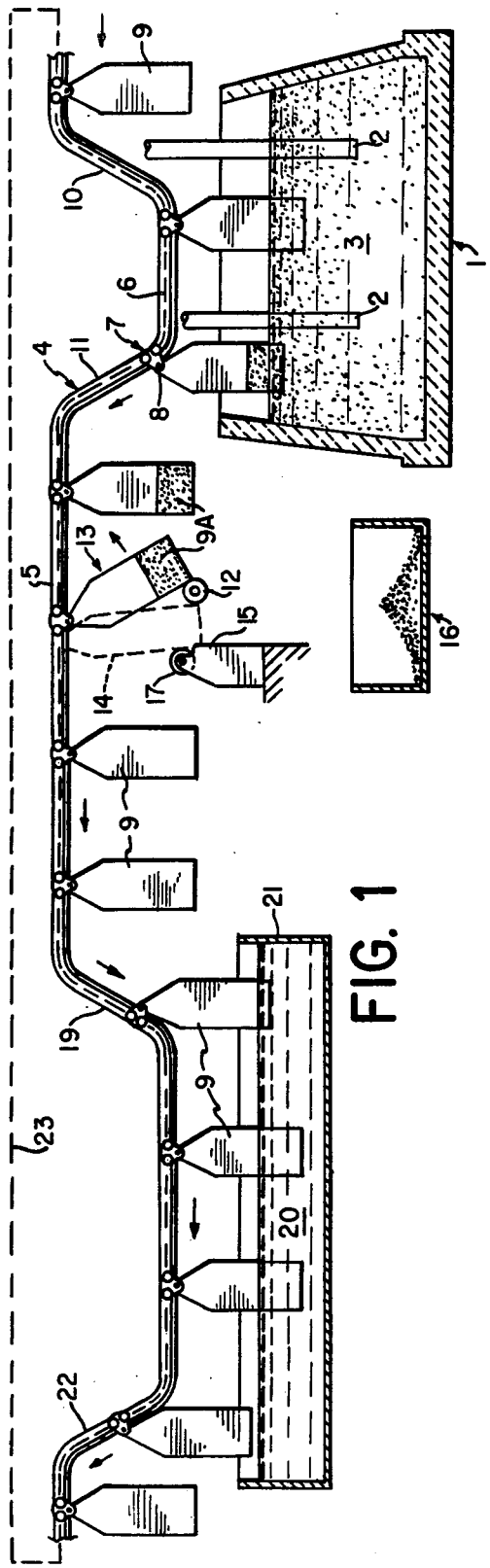
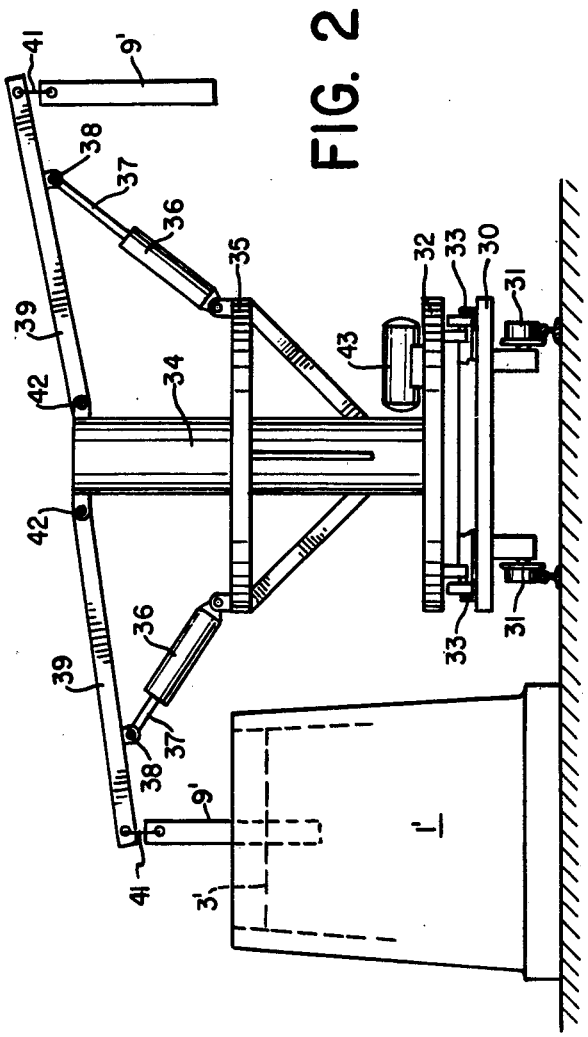

4,194,887

FUSED ALUMINA-ZIRCONIA ABRASIVE MATERIAL FORMED BY AN IMMERSION PROCESS

This is a division of application Ser. No. 636,403, filed Dec. 1, 1975 now U.S. Pat. No. 4,073,096.

BACKGROUND OF THE INVENTION

This invention relates to the manufacture of fused material having a very small ultimate crystal size by virtue of a novel method of high speed cooling from the molten state. It is intended to apply principally to the manufacture of oxidic abrasive materials such as those commonly produced by the fusion of chemically purified alumina, or by the fusion and partial reduction of bauxite which has been known for many years by the term "regular aluminum oxide", as well as to alumina-zirconia fused abrasive materials containing amounts of zirconia up to and including the eutectic composition, being about 42 percent zirconia by weight. The said alumina-zirconia materials may contain varying amounts of other constituents commonly associated with bauxite, such as iron oxide, titanium oxide, and silicon oxide. The novel process disclosed herein is, however, not limited to the compositions set forth above.

The fusion and reduction of bauxite for abrasive purposes has long been known, following the teaching of U.S. Pat. No. 659,926 to Jacobs (Oct. 16, 1900). The manufacture of alumina-zirconia abrasive materials is likewise old, as shown by U.S. Pat. Nos. 1,240,490 and 1,240,491 to Saunders et al (both Sept. 18, 1917) as well as by U.S. Pat. No. 3,181,939 to Marshall et al. (May 4, 1965).

It has also been known since the time of U.S. Pat. No. 1,192,709 to Tone (July 25, 1916) that pouring molten aluminous abrasive material from the furnace into a mold so as to freeze the abrasive material relatively quickly will yield a solid abrasive material of small crystal size by virtue of which a durable and strong product will result, having utility in the production of abrasive grains especially suited for heavy grinding. For this reason, much attention has been paid to methods of achieving a fine crystal structure.

More recently, U.S. Pat. No. 3,781,172 to Pett et al. (Dec. 25, 1973) describes pouring a molten abrasive composition over relatively cold lumps of similar aorasive material to achieve fast cooling and fine crystal size. U.S. Pat. No. 3,726,621 to Cichy (Apr. 10, 1973) teaches casting the molten abrasive composition into a plurality of steel balls to obtain a fast cooling rate and fine crystal size. Canadian Pat. No. 956,122 to Scott (Oct. 15, 1974) describes pouring the molten abrasive material into a vessel having a plurality of parallel spaced metal plates therein to give a fine crystal size. Canadian Pat. No. 924,112 to Shurie (Apr. 10, 1973) teaches casting the molten material into a plurality of objects having a relatively high thermal conductivity. U.S. Pat. No. 3,646,713 to Marshall et al. (March 7, 1972) covers an apparatus involving a cool rotating casting cylinder and pressure roll to cool and densify the abrasive material.

All of the methods referred to in the proceding paragraph entail pouring the melted abrasive material from the furnace into vessels or contrivances for subsequent cooling. This requires expensive and complicated furnaces capable of pouring the molten material therefrom, usually by tilting the furnace. The prior methods also involve the fabrication and maintenance of expensive molds or contrivances to handle the poured liquid. The action of molten abrasive materials at temperatures usually in excess of 1800° C. can cause damage to equipment with consequent costly maintenance and frequent replacement. The pouring operations also may be dangerous to the operating personnel.

All of these methods also involve a time loss resulting from the interruption of the charging and fusing operation by the pouring operation. Likewise there is a time lapse between egress of the molten material from the furnace and ingress into the receptable. During this time, heat is lost from the melt. Consequently, it is necessary in any such pouring process, to heat the melt well above its fusion temperature to compensate for unavoidable heat losses in pouring and to prevent premature solidification. This higher temperature requires a corresponding expenditure of extra power in the furnace during melting. Thus, there is a waste of energy.

Another shortcoming in these conventional methods is their relatively high demand of operating labor. In such processes there will be, in addition to one or more furnace operators, extra personnel to place, assemble, empty, clean, and service the receptable equipment. A high production rate requires a correspondingly higher requirement of such extra personnel in addition to a greater investment in the receptable equipment itself.

SUMMARY OF THE INVENTION

The invention which is the subject of this application addresses itself to solving or at least ameliorating these problems. Basically the invention involves heating an abrasive mixture to a molten condition, immersion (or partially dipping) of a cold substrate into the melt so as to cause a thin layer or plate of solid abrasive material to freeze with great rapidity on the surfaces of the substrate, withdrawal of the plated substrate from the melt, and breaking away of the solid abrasive material from the substrate as relatively thin plate-like material, and collection of this material for further processing into abrasive grain.

Our invention may be understood by reference to the melting of abrasive material in a furnace of the type known as a "Higgins Furnace", described in U.S. Pat. No. 775,654 (Nov. 22, 1904). This furnace, widely used in the fusion of abrasive materials, is very simple in design and much lower in cost than a tilting arc furnace. The Higgins furnace is not capable of being tilted but, unlike other processes, this is not necessary in the present invention since no tilting, tapping, pouring, or casting of the molten abrasive material is involved.

A simple plate or object of steel (or other suitable heat sink material) referred to hereinafter as a "heat sink" is provided with a handle or other means of moving and holding the plate so that it may be dipped in the melt. The heat sink is then dipped in the melt in the furnace and held for a short period of time to allow the abrasive material to solidify on it to the desired thickness. It is then removed from the melt together with the solid abrasive deposit on it in the form of a uniform plate conforming to the surface of the heat sink. The plate remains on the heat sink because of its close conformity to the surface but is not otherwise adherent thereto. Consequently, a blow with a hammer or the like will crack the plate-like deposit and cause it to fall cleanly from the heat sink.

It is believed that the heat sink causes the solid deposit to form because it has absorbed sufficient heat to cause the temperature of an immediately adjacent layer of the abrasive melt to fall below the freezing point. The heat sink thus is heated up to some degree, and it should therefore be allowed to cool before it is used again. This cooling may quickly and easily be effected by dipping the heat sink in a coolant liquid (usually water) and drying whereupon it is ready to be used again in the manner described above.

The heat sink material which serves as the substrate upon which the abrasive material is deposited is not limited to any particular geometric shape or form, thus rods, balls, tubes, and sheets may be employed in lieu of a plate. Although the preferred heat sink material is steel, the process may be practiced using other heat sink material. Selection of suitable heat sink materials is limited by their ability to withstand the process conditions. Clearly, the mass of the heat sink must be sufficiently great to permit it to absorb the heat from the melt, without itself melting. It is easy to provide a plate of steel, for example, of sufficient heat capacity to allow solid abrasive plates of the preferred thickness to be obtained in a short time.

In addition, the heat sink should not be easily frangible and must be able to withstand the repeated sharp blows that may be used to dislodge the abrasive deposits. Finally, the heat sink material should be able to withstand wide temperature variations in the melt, between about 17° C. and 2000° C. without cracking or breaking. The heat sink may be selected from any metal which is non-reactive with the coating material.

The abrasive materials used in the process of the invention are usually in a comminuted form and include alumina and alumina-zirconia fused materials containing amounts of zirconia up to and including the eutectic composition, being about 42% zirconia by weight. Suitable melts may also be formed by the fusion of chemically purified alumina or of a product made by fusion and partial reduction of bauxite, commonly termed "regular aluminum oxide". The oxidic material may contain varying amounts of other constituents commonly associated with bauxite, such as the oxides of iron, titanium, and silicon. Those skilled in the art will recognize that the practice of the instant invention is not limited to the foregoing compositions and may be practiced with any chemical composition which is ordinarily employed to produce abrasive materials and which may be melted in a Higgins furnace.

The thickness of the abrasive deposit on the heat sink substrate may be controlled by adjusting the immersion time of the substrate in the abrasive melt. Abrasive deposit thickness on the substrate has been found to be proportional to immersion time in the melt and longer immersion periods generally result in thicker abrasive deposits. In operation, the immersion time required to deposit a given abrasive thickness on a particular substrate will vary depending upon the composition of the melt, the particular substrate in use and the relative temperatures thereof. The melt temperature is not critical and it is sufficient for purposes of the invention that the Higgins furnace heat the abrasive mix until it is in the molten state. Further heating beyond this point is both unnecessary and economically wasteful. This is an important advantage of the present invention since the prior art tilting furnaces require that the abrasives be superheated (above melting temperature) in order to permit pouring.

In most instances an abrasive deposit of between about 0.5 and 3.0 millimeters provides satisfactory abrasive grains from alumina-zirconia compositions. Preferably the thickness of the abrasive deposited on the heat sink substrate is approximately equivalent to one dimension of the abrasive grain size being sought in the final product.

The process of the invention may be carried out automatically in a conveyor system of the type illustrated in FIGS. 1 and 2 or alternatively by means of a manual dipping operation, or by other arrangements.

The instant process presents many advantages over the prior art, including:

(a) No tapping, pouring, or casting of the molten material is practiced.

(b) Only a simple relatively inexpensive Higgins furnace or the like is required.

(c) Heat sinks may be simple pieces of ordinary steel. No close fits or requirements of shape are necessary.

(d) Unlike closely fitted parallel steel plate molds, warpage of the heat sinks is unimportant since there is no requirement to fit a mold or maintain a physical dimension.

(e) No molds are required.

(f) There is no dangerous handling of molten abrasive material outside the furnace.

(g) There are no oxidation or other effects resulting from exposure to air since the abrasive material is substantially entirely solidified beneath the liquid surface.

(h) Freezing is practically instantaneous, leading to extra fine crystal size.

(i) Energy is conserved since the process is truly continuous, and there is no need to provide extra heat as in conventional pouring operations.

(j) Labor is saved since the process may readily be automated.

(k) A high yield of useful sizes of abrasive grains will be obtained since the thickness of the solidified plates may be controlled to conform with sizes desired.

(l) The process may readily be conducted on a continuous basis.

The realization of these advantages are objects of this invention.

In addition it is an object of the present invention to provide abrasive material having a very small crystal size, the said material being highly uniform and rendered in a plate-like form of uniform controlled thickness so as to give a high yield of abrasive grains upon crushing and screening.

Other objects are to avoid pouring molten abrasive from the furnace, provision for the use of inexpensive and simple furnaces, the avoidance of critical or close-fitting assemblies, the elimination of molds, the protection of the product from air until it is solid, the achievement of very fast cooling rates, the conservation of energy, the conservation of labor, and the achievement of a continuous process.

To achieve these objectives we prefer to operate the process essentially as described below. It is, however, emphasized that the particular embodiments set forth are not exclusive of other arrangements and are but two examples and not to be construed in a limiting sense. It should also be understood that the hereinafter described apparatus are not the subject of this invention.

BRIEF DESCRIPTION OF THE DRAWINGS

FIG. 1 is a schematic representation of a process in accordance with our invention.

FIG. 2 is a schematic representation of another embodiment of our process.

DESCRIPTION OF THE PREFERRED EMBODIMENT

Referring to FIG. 1, a Higgins type furnace 1 is supplied with graphite electrodes 2 depending into the abrasive melt 3 therein. The abrasive material is kept in the molten state by passage of electric current from the electrodes through the said abrasive material in a manner well-known in the art. Passing overhead, transverse of furnace 1, and between the electrodes 2, is a trolley conveyor 4 including beam 5, chain 6, trolleys 7, and clevis 8 which supports a plurality of heat sinks 9 as shown. Movement of the chain, trolley, and clevis assembly transports heat sinks 9 serially down slope 10 so that the lower portions of heat sinks 9 are immersed in the melt.

Heat sinks 9 remain in the melt for a time established by the linear velocity of the chain, whereupon heat sinks 9 are withdrawn from the melt by an upward slope of the conveyor 11. The time for which sinks 9 remain in the melt is sufficient to plate sinks 9 with the desired thickness of solidified abrasive material 9A on the sinks.

Heat sinks 9 are serially transported so as to impinge upon a roller 12 which raises the heat sink to an inclined position (Reference sink is shown in inclined position 13). As the heat sink rides over roller 12, it falls abruptly to position 14 shown in dashed lines, where it forcibly strikes an immovable block 15, or the like, thus knocking off the loosely-adherent plate-like abrasive material 35 which falls into box 16 or alternately into a chute (not shown) for recovery and further processing into abrasive grain.

Heat sink 9, when thus freed of abrasive material 9A, is then transported so as to pass over roller 17 after which it resumes its normal depending position. At this point the heat sink is still hot. It is then transported down slope 19 so that the lower portion of the heat sink is immersed in water 20 preferably at a temperature between about 5° C. and 95° C. in the case of the preferred steel heat sink, contained in tank 21 to cool the heat sink as it is moved along. Cooled heat sink 9 is raised from the water by slope 22 and further transported to the point of beginning. In this diagram, the continuity of the process is indicated by dotted line 23. Not shown are conveyor drive, cornering mechanisms, and supporting structures, which may be of conventional design.

Our process employs a Higgins furnace thus obviating the use of an expensive and complicated tilting furnace, since it is clear that no pouring of the melt is involved. As the conveyor carries the appended heat sinks around the circuit, they are automatically dipped into the melt so as to acquire a frozen layer of the abrasive material. The heat sinks then are withdrawn from the furnace by the forward motion of the conveyor and the abrasive material is broken off in plate-like form of controlled thickness. The process is therefore readily amenable to automation and labor is minimized with a consequent cost saving. Also, it is clear that the plate thickness can be controlled for example by adjusting the conveyor speed rate and hence the retention time of the heat sink in the melt. The final yield of abrasive grain of the desired size after crushing is dependent on the initial thickness of the plate. It follows that provision of plate of the optimum thickness permits optimization of final product yield.

The heat sinks operate by absorbing heat from the adjacent melt and do not require the proximity of other objects or structures. Thus there is no requirement for close fitting relations or plurality of parts in the melt. This eliminates difficulties associated with such complexity. For example, warpage of the heat sinks will not cause difficulty since such a warped heat sink is just as effective as an unwarped heat sink. The deposition of the plate-like abrasive material conforms to the shape of the heat sink even if the heat sink is warped. This is particularly an advantage over molds in which parallel plates are arranged. In the latter case, warpage of the plates has the effect of closing some of the apertures, and increasing others. Difficulties in reassembling the mold elements would also be encountered.

As described above, the heat sinks are cooled in tank 21 containing a liquid coolant, preferably water. The preferred coolant, water, may be maintained at any level to give the degree of cooling desired. We prefer to maintain the water temperature below the boiling point in the range 5° C. to 95° C. to promote rapid temperature reduction. Lower coolant temperatures promote faster cooling thus enabling the temperature of the heat sink to be lowered after a short immersion period. In most instances the residual surface coolant will evaporate quickly when the heat sink is withdrawn from the coolant. Extreme care should be taken to see that the surface is dry to avoid the explosive expansion of water to steam upon reentry into the melt. When dry, the heat sink may re-enter the melt. Although water is the preferred coolant liquid, other coolants such as expanding condensed freon or cooled ethyleneglycol-water mixtures may be employed to further increase the cooling rate of the heat sink in the abrasive melt. As a matter of economy and conservation, the coolant liquid may be circulated by means of a pump or other conventional apparatus. Alternatively, coolant liquid may be applied by spraying onto the heated substrate surface.

Another illustrative embodiment is shown in FIG. 2. Again, a Higgins furnace 1' or the like is used. (Primed numbers are used to refer to elements corresponding to those described in FIG. 1.) The abrasive material is fused therein by the action of electric current passing through melt 3' between electrodes (not shown).

The apparatus is provided with a base 30 on wheels 31 which permit the said apparatus to be located in a desired position in relation to the furnace 1'. Located on base 30 is a horizontally rotatable upper base 32 supported on circularly disposed wheels and track 33 so that the entire superincumbent structure is completely rotatable in a horizontal plane.

A central column 34 has an attached frame 35 to which are secured the lower ends of a plurality of air-actuated cylinders 36. These cylinders contain pistons (not visible) attached to piston rods 37 extending upward to points of flexible attachments 38 to arms 39. Near the outward extremities of the arms, heat sinks 9' (as hereinbefore described) are hung by means of flexible connectors 41. The opposite extremities of the arms are attached to the central column by means of flexible fittings 42.

In operation, arms 39 are raised by the attached air cylinders using air from the compressor 43 to the position shown in solid line so that the heat sinks 9', upon rotation of the apparatus, will clear the top of furnace 1'. Rotation of the apparatus is effected by motors and controls (not shown) so that the rotation is programmably indexed to pause for preset angular positions. During these pauses, one of the arms 39 and attached heat sinks 9' are located directly above furnace 1', and are lowered by the action of the air-actuated cylinders 36 to immerse the lower portion of the heat sink in the melt whereupon a layer of abrasive material is frozen thereon. Heat sinks 9' are then lifted from the melt and the apparatus rotated to the next radial position where the solid abrasive material is knocked off the heat sink either manually or by automated air-gun (not shown). At the next rotation, the heat sink is lowered into a water tank (not shown) to cool said heat sink preparatory to re-immersion in the furnace melt.

The invention will be further illustrated in the following examples.

EXAMPLE 1

A mixture of 75 percent by weight of granular regular aluminum oxide (about 95% $Al_2O_3$) and 25 percent by weight of zirconia was brought to fusion in an electric arc Higgins furnace. A steel block 12"×8"×1½", equipped with a steel pipe handle, was dipped into the melt for a period of 5 seconds after which it was withdrawn, and the plate-like deposit knocked off with a hammer. The plate-like material was dense in appearance and about ⅛" in thickness. The heat sink was cooled in water and the procedure repeated several times with similar results.

EXAMPLE II

The preceding trial was repeated except that the steel block heat sink was allowed to remain in the melt for 10 seconds before withdrawal. This produced a plate of abrasive material about 3/16" in thickness.

A microscopic examination of this product showed a dense structure which was comprised of a primary phase of thin elongated dendritic crystals arranged in parallel bundles, oriented generally outward from the cold surface, said crystals embedded in a eutectic matrix. The width of these primary dendrites (measured transversely to the longitudinal axis of the dendrite) was found to vary from about 3 to about 36 micrometers depending on the distance from the surface of the heat sink. The average dendritic width was about 15 micrometers which is exceptionally small for this composition. The same composition cooled by pouring from a furnace onto a cold table averaged about 40–50 micrometers on the width of the primary dentritic crystals.

EXAMPLE III

An abrasive feedstock consisting of granular regular aluminum oxide was loaded into a Higgins furnace and heated to the molten state using a 700 kilowatt electric arc. Steel blocks measuring 12 inches by 8 inches by 1½ inches equipped with steel pipe handles were dipped into the melt for varying time periods. Each block was withdrawn at the conclusion of the immersion time and the abrasive material deposited on the steel dislodged by delivering a sharp blow to an uncoated portion of the plate with a hammer. The plate thickness was then measured and the following results obtained.

| IMMERSION TIME (IN SECONDS) | AVERAGE PLATE THICKNESS (IN MILLIMETERS) |
| --- | --- |
| 1 second | 1.67 |
| 5 seconds | 2.12 |
| 7 seconds | 2.67 |
| 10 seconds | 2.89 |
| 15 seconds | 3.13 |

The results indicate that plate thickness is proportional to melt immersion time.

EXAMPLE IV

Granular baddeleyite ($ZrO_2$) was added incrementally to the melt of Example III to vary the melt composition. Following each incremental addition of baddeleyite a steel plate similar to that employed in Example I was immersed in the melt for 10 seconds, withdrawn, and the abrasive deposit on the plate dislodged by means of a sharp hammer blow to an uncoated plate segment. The dislodged abrasive plate was then collected and measured. The results are indicated in the following table.

| SAMPLE NO. | AVERAGE PLATE THICKNESS (MILLIMETERS) | $ZrO_2$ (PERCENTAGE) |
| --- | --- | --- |
| 1 | 2.69 | 1.0 |
| 2 | 2.54 | 5.6 |
| 3 | 2.81 | 6.3 |
| 4 | 2.68 | 8.3 |
| 5 | 2.97 | 8.2 |
| 6 | 3.01 | 11.0 |
| 7 | 3.03 | 12.6 |
| 8 | 3.43 | 14.0 |
| 9 | 3.40 | 16.5 |
| 10 | 3.37 | 20.5 |
| 11 | 3.23 | 25.1 |
| 12 | 3.11 | 26.6 |
| 13 | 3.23 | 30.0 |
| 14 | 2.93 | 31.2 |
| 15 | 2.80 | 33.7 |
| 16 | 2.79 | 39.8 |

The results indicate that varying abrasive compositions may be successfully deposited on a substrate according to the present invention.

EXAMPLE V

A mix of 75% by weight of granular regular aluminum oxide and 25% by weight of baddeleyite ($ZrO_2$) was melted in an arc furnace. A heat sink comprising a round steel rod 1⅛ inch in diameter was immersed for varying time periods in said melt. Prior to each immersion, the heat sink was cooled to substantially room temperature by submersing in water followed by air drying. After each immersion in the alumina-zirconia melt, the plate-like solidified deposit on the heat sink was removed by striking the heat sink with a hammer. It was found that the average plate thickness increased with increasing immersion time as shown by the following Table.

| IMMERSION TIME (Seconds) | AVERAGE PLATE THICKNESS (Millimeters) |
| --- | --- |
| 1 | 1.0 |
| 2 | 1.5 |
| 3 | 1.8 |
| 4 | 2.1 |

-continued

| IMMERSION TIME (Seconds) | AVERAGE PLATE THICKNESS (Millimeters) |
| --- | --- |
| 5 | 2.4 |
| 6 | 2.3 |
| 7 | 2.5 |
| 8 | 2.8 |
| 10 | 3.2 |
| 15 | 3.7 |

These data show that the plate thickness can be controlled by proper selection of immersion time.

It is our belief that means other than impact shock, e.g. sonic means, thermal shock or the like can be used to remove the plate-like deposit from the heat sink.

While the above descriptions discuss several preferred embodiments for practicing our process, it is to be understood that those skilled in the art will devise other arrangements for practicing our process. The above descriptions therefore are not set forth as a limiting disclosure but only to illustrate preferred embodiments of our process. Accordingly, our invention is that which is set forth in the following claims.

What is claimed is:

1. An abrasive product consisting essentially of a thin plate of abrasive material having an ultra-fine crystal size, orientation and structure, said material being highly uniform throughout the thickness of said plate and being prepared by
    (a) melting an abrasive mix containing aluminum oxide and zirconium oxide in a stationary electric arc furnace,
    (b) removably positioning a cool substrate material in the melted mix in the furnace for a predetermined time period to deposit a coating of solidified abrasive material on said substrate,
    (c) withdrawing the entire substrate and the solidified coating from the melt, and
    (d) removing the solidified abrasive material from the substrate.

2. The product defined by claim 1 wherein the solidified abrasive is a plate-like deposit of predetermined thickness which is obtained by controlling immersion time of the substrate in the melt.

3. The abrasive product defined by claim 2 wherein said solidified abrasive plate has a thickness of between about 0.5 and 3.0 millimeters.

4. The abrasive product of claim 2 wherein said substrate comprises a metal which is non-reactive with said melted abrasive mix.

5. The abrasive product of claim 2 which comprises a primary phase of thin elongated dendritic crystals arranged in parallel bundles, and oriented generally outward from the surface of said substrate.

6. The abrasive product of claim 4 wherein the crystals of said material are embedded in a eutectic matrix.

7. The product of claim 5 wherein said primary dendrites have a width, measured transversely to the longitudinal axis of the dendrite, of from about 3 to about 50 micrometers.

8. The abrasive product of claim 2 wherein said abrasive mix contains one or more members selected from the group consisting of iron oxide, titanium oxide and silicon oxide.

* * * * *